(12) United States Patent
Vaughn et al.

(10) Patent No.: US 8,752,425 B2
(45) Date of Patent: Jun. 17, 2014

(54) FLOW METER WITH HOLLOW BLOCKING ROTOR

(75) Inventors: David T. Vaughn, Union Grove, WI (US); Sean P. Hays, Elgin, IL (US)

(73) Assignee: Liquid Controls Group, A Unit of IDEX Corporation, Lake Bluff, IL (US)

(*) Notice: Subject to any disclaimer, the term of this patent is extended or adjusted under 35 U.S.C. 154(b) by 184 days.

(21) Appl. No.: 13/485,084

(22) Filed: May 31, 2012

(65) Prior Publication Data

US 2013/0319106 A1    Dec. 5, 2013

(51) Int. Cl.
*G01F 3/08* (2006.01)

(52) U.S. Cl.
USPC .......................................................... 73/253

(58) Field of Classification Search
USPC ............................................................ 73/253
See application file for complete search history.

(56) References Cited

U.S. PATENT DOCUMENTS

| | | | | |
|---|---|---|---|---|
| 3,518,882 A | * | 7/1970 | Granberg | ......................... 73/253 |
| 4,253,333 A | * | 3/1981 | Schneider | ......................... 73/253 |
| 5,808,196 A | | 9/1998 | Kolb, III | |
| 2011/0167903 A1 | | 7/2011 | Herr | |

* cited by examiner

*Primary Examiner* — Jewel V Thompson
(74) *Attorney, Agent, or Firm* — Miller, Matthias & Hull LLP

(57) ABSTRACT

A flow meter is disclosed with a hollow blocking rotor. The flow meter includes a housing that has a cavity with an inlet and an outlet. The flow meter also includes a pair of displacement rotors with a blocking rotor disposed between the displacement rotors. The blocking rotor includes a pair of convex walls and a pair of concave walls. The blocking rotor further includes a shaft coupled to the pair of concave walls. Each concave wall is disposed between and coupled to a pair of opposing convex walls. The concave walls provide clearance for rotation of the displacement rotors when the displacement rotors sweep along the concave walls. The hollow configuration of the blocking rotor reduces the impedance of the flow meter.

15 Claims, 5 Drawing Sheets

FLOW METER WITH HOLLOW BLOCKING ROTOR

TECHNICAL FIELD

This disclosure relates to improvements in positive displacement fluid flow meters, and more particularly to a blocking rotor for such flow meters.

BACKGROUND

Gasoline storage tank facilities, gasoline transport trucks, underground natural gas delivery systems, or other fluid storage or delivery systems generally have a positive displacement flow meter connected in line in the fluid delivery system. Pumping of the fluid, whether gas or liquid, through the delivery line causes movement of the rotors in the flow meter which drives a mechanical or electrical counting device to measure precisely the volume of fluid flow through the meter.

Some flow meters have a housing that defines a cavity within which three rotors are rotatably mounted. The three rotors include a pair of displacement rotors and a blocking rotor disposed between the displacement rotors. One of the displacement rotors is disposed towards the inlet of the flow meter; the other displacement rotor is disposed towards the outlet. As the blocking rotor rotates, it mates with the inlet displacement rotor disposed to close off part of the cavity to define a flow path along which the fluid must pass, thereby causing the displacement rotors and blocking rotor to rotate. The rotation of the displacement and blocking rotors creates a motion that can be correlated to the fluid volume passing through the meter, making it possible to translate the rotation of the displacement rotors into a meter reading showing fluid volume flow.

Typically, the entire fluid flow through a conduit is diverted through the flow meter in order to provide a flow throughput reading. Therefore, it is desirable that the flow meter add as little flow impedance as possible to the flow to minimize energy losses and to maintain the intended flow rate. To that end, it is desirable to provide a flow meter with rotors having low mass but sufficient strength for a long and accurate service life. For obvious reasons, it is also desirable to provide housings for flow meters that are as compact as possible.

A continuing need then exists to provide flow meters of the type utilizing blocking and displacement rotors of lightweight yet strong construction. Specifically, flow meters used for dispensing liquefied petroleum gas (LPG) are subjected to sudden focus in the event the LPG flashes. As a result, prior art blocking rotors are prone to breakage. Specifically, despite the use of reinforcing ribs 1400, the blocking rotor 115 of FIG. 2A is prone to breakage along the ribbed wall 140 near the spindle 155 while the blocking rotor 315 of FIG. 2C is prone to breakage on the wall 340 on either side of the shaft 355. Finally, the shaftless blocking rotor 215 of FIG. 2B is prone to breakage near the axial center of the wall 240.

Another problem with the prior art blocking rotors 115, 215, 315 of FIGS. 2A-2C is the high moments of inertia associated with each rotor 115, 215, 315 that require more energy to initiate rotation of the rotors 115, 215, 315 and more time to stop rotation of the rotors 115, 215, 315. The slower stopping ability of the rotors 115, 215, 315 in unwanted leakage through the flow meter after the dispensing has stopped thereby compromising the accuracy of the dispense.

SUMMARY OF THE DISCLOSURE

In one aspect of this disclosure, a blocking rotor for a rotary fluid displacement device is disclosed. The rotary fluid displacement device also includes a pair of displacement rotors that flank the blocking rotor. The blocking rotor includes a pair of convex walls and a pair of concave walls. The blocking rotor further includes a shaft coupled to the pair of concave walls. Each concave wall is disposed between and coupled to the pair of convex walls. As a result, the concave walls provide clearance for rotation of the displacement rotors.

In another aspect of this disclosure, a flow meter is disclosed. The disclosed flow meter includes a housing having a cavity with an inlet and an outlet. The flow meter also includes a pair of displacement rotors with a blocking rotor disposed between the displacement rotors. The blocking rotor includes a pair of convex walls and a pair of concave walls. The blocking rotor further includes a shaft coupled to the pair of concave walls. Each concave wall being disposed between and coupled to the pair of opposing convex walls. As a result, the concave walls provide clearance for rotation of the displacement rotors when the displacement rotors sweep along said concave walls.

A method of casting a blocking rotor of a flow meter is also disclosed. The method includes providing a mold for a hollow blocking rotor having a pair of convex walls and a pair of concave walls. Each concave wall is disposed between and coupled to the pair of opposing convex walls. The mold further includes gates and overflows and the gates and overflows are disposed on the concave walls and not the convex walls. The method further includes injecting material into the mold through the gates.

In any one or more of the embodiments described above, the shaft includes opposing ends. Each end of the shaft is coupled to a journal. In any one or more of the embodiments described above, the shaft extends beyond the convex walls to form journals that extend beyond the convex walls. In any one or more of the embodiments described above, the shaft couples the concave walls together. Further, in any one or more of the embodiments described above, the shaft couples the concave walls together at apexes of the concave walls. In any one or more of the embodiments described above, the shaft may be hollow or solid. In any one or more of the embodiments described above, the concave walls may be coupled together at apexes of the concave walls. In any one or more of the embodiments described above, the blocking rotor may be cast with gates and overflows being disposed on the concave walls as opposed to the convex walls.

DETAILED DESCRIPTION

Figure 1:
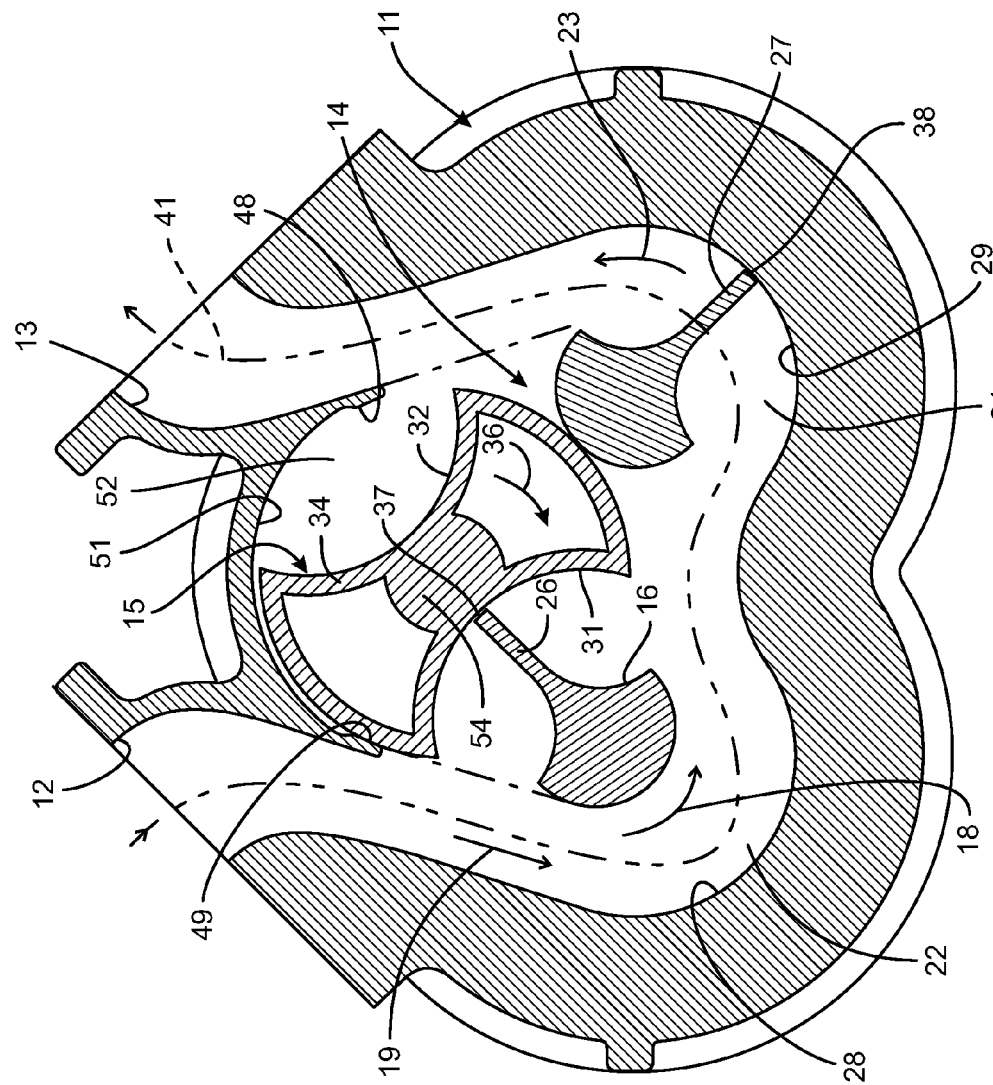
FIG. 1 is a sectional view of a flow meter constructed in accordance with this disclosure, showing placement of the displacement and blocking rotors within the flow meter housing.

Turning first to FIG. 1, a flow meter 10 is disclosed that includes a housing 11, an inlet port 12, an outlet port 13 and a cavity 14 that defines a flow path and accommodates the rotors 15, 16, 17. The rotors 15, 16, 17 include a blocking rotor 15, the design of which is disclosed herein, and a pair of displacement rotors 16, 17. The displacement rotor 16 will hereinafter be referred to as the inlet displacement rotor 16 as it rotates in the direction of the arrow 18 thereby pumping fluid entering the inlet 12 in the direction of the arrow 19 and through the first arcuate chamber 22. The displacement rotor 17 will be referred to as the outlet displacement rotor 17 as it rotates in the direction of the arrow 23 and sweeps fluid from the second arcuate chamber 24 in the direction of the arrow 25 towards the outlet 13.

In the embodiment illustrated in FIG. 1, the housing 11 forms the cavity 14 which, with the exception of the inlet and outlets 12, 13, forms a generally trefoil shape or clover shape due to the triangulated relationship between the blocking rotor 15 and inlet and outlet displacement rotors 16, 17. The cavity 14 includes a pair of arcuate pumping chambers 22, 24. As the displacement rotors 16, 17 rotate, the vanes 26, 27 of the displacement rotors 16, 17 sweep along the interior surfaces 28, 29 of the arcuate chambers 22, 24 to propel the liquid towards the outlet 13. The position of the displacement rotors 16, 17 and the length of the vanes 26, 27 also enables the vanes 26, 27 to sweep along the exterior surfaces 31, 32 of the concave walls 33, 34 of the blocking rotor 15 as the blocking rotor 15 rotates in the direction of the arrow 36.

The wiping contact between the distal ends 37, 38 of the vanes 26, 27 of the displacement rotors 16, 17 along the exterior surfaces 31, 32 of the blocking rotor 15 helps to keep from fluid leaking past the vanes 26, 27 when the vanes are rotating along the concave walls 33, 34 so that the fluid passing through the flow meter 10 follows a flow path indicated by the dashed line 41.

Figure 8:
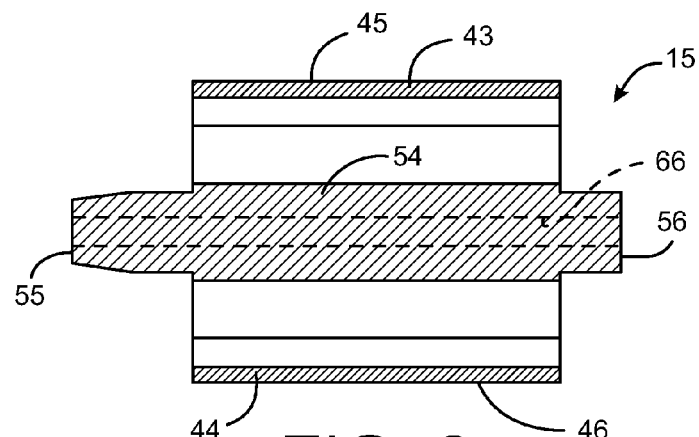
FIG. 8 is a sectional view taken substantially along line 8-8 of FIG. 4.

Referring to the blocking rotor 15 and FIGS. 1 and 3-8, the blocking rotor 15 is substantially hollow and is fabricated from the pair of concave walls 33, 34 that are disposed between and connected to a pair of convex walls 43, 44. The convex walls 43, 44 include outer surfaces 45, 46 that engage the protuberances 48, 49 formed on the inner surface 51 of the third arcuate chamber 52 to limit leakage of fluid into the arcuate chamber 52 and maintain fluid flowing through the meter along the flow path 41. Again, the goal of the flow meter 10 is to provide as little impedance to the flow of fluid flowing between the inlet 12 and the outlet 13. To provide structural integrity to the blocking rotor 15, a shaft-like structure 54 (FIGS. 1, 6 and 8) is utilized to couple the concave walls 33, 34 together. As seen in FIG. 8, the shaft 54 includes distal ends that extend beyond the convex and concave walls 33, 34, 43, 44 to form journals 55, 56. The journals 55, 56 may be integral to the shaft-like structure 54 or they may be coupled to the shaft 54 separately. The journals 55, 56 are received in the openings 57, 58 in the end plates 61, 62 respectively (see FIG. 9).

Thus, instead of the entire cross section of the blocking rotor 15 being filled with material, the blocking rotor 15 only has four walls 33, 34, 43, 44 of a prescribed thickness. The convex walls 43, 44 define the outer diameter of the rotor 15. The concave walls 33, 34 is designed to be wiped by the vanes 26, 27 of the displacement rotors 16, 17 to reduce hydrodynamic losses that occur with traditional rotor designs. As an option, the rotor 15 may include internal ribbing to add additional rigidity. Such internal ribbing is shown in phantom at 63, 64 of FIG. 6.

A benefit of the disclosed design for the blocking rotor 15 is provided when casting is used to fabricate the blocking rotor 15. Specifically, when using casting as the casting technology to cast the rotor 15, the gating and overflows are preferably disposed on the concave walls 33, 34 as opposed to the convex walls 43, 44. By placing the gating and overflow on the concave walls 33, 34, tear-out/break-out of material on the critical outer surfaces 45, 46 of the convex walls 43, 44 is avoided thereby reducing leakage into the third annular chamber 52 (FIG. 1).

Figure 6:
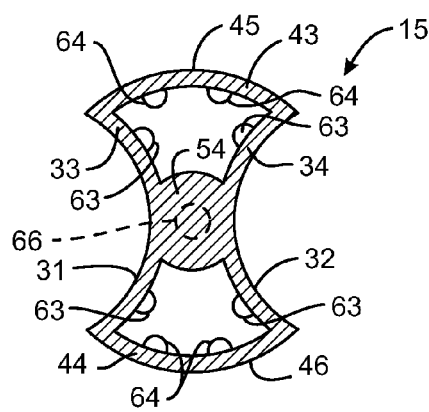
FIG. 6 is a sectional view taken substantially along line 6-6 of FIG. 5.
Figure 7:
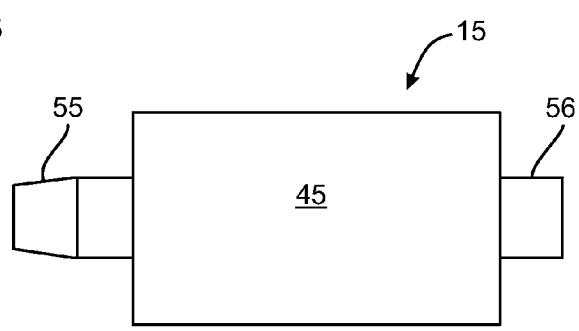
FIG. 7 is a bottom plan view of the blocking rotor shown in FIGS. 1 and 3-6.

The shaft 54 may be solid, partially cord or hollow, depending upon the meter size and application. Such an optional through opening 66 is illustrated in FIGS. 6 and 8. As another option, the concave walls 33, 34 may meet at their apexes to form a rigid structure that would function like the shaft-like structure 54.

Figure 3A:
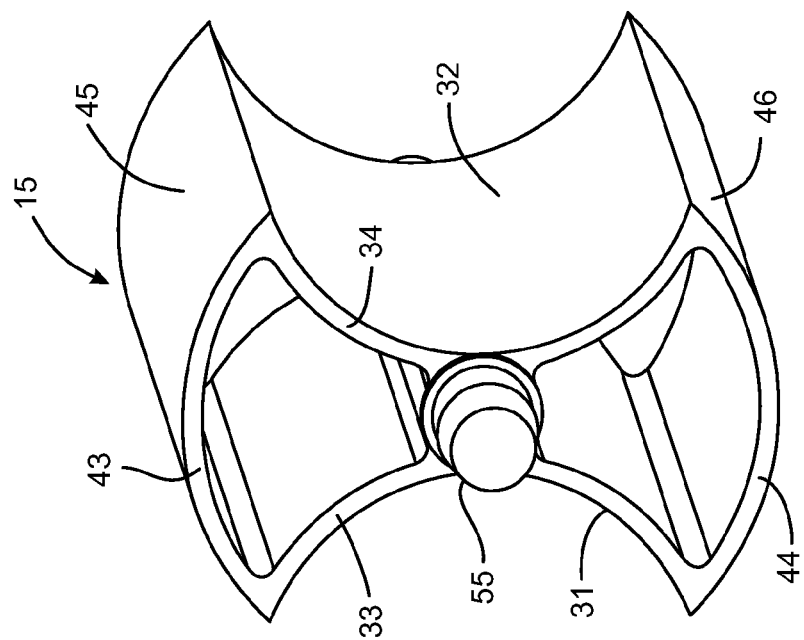
FIGS. 3A-3B are perspective views of disclosed blocking rotors.
Figure 2A:
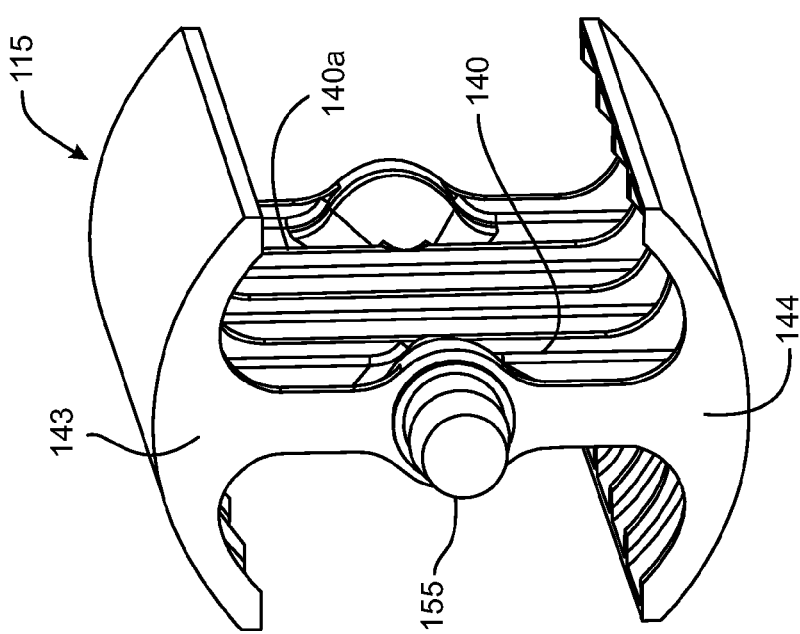
FIGS. 2A-2C are perspective views of a prior art blocking rotors.
Figure 3B:
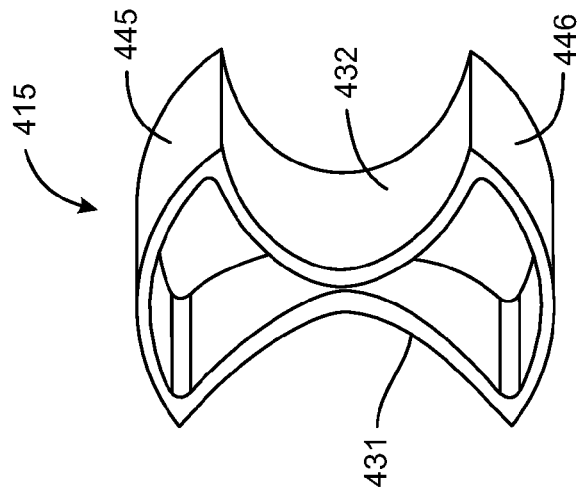

Comparing FIGS. 2A and 3A, the disclosed rotor 15 has a substantially reduced mass in comparison to the prior art blocking rotor 115 shown in FIG. 2A. The addition of the convex walls 33, 34 enables the convex walls 43, 44 of the blocking rotor 15 to be substantially thinner than the convex walls 143, 144 of the blocking rotor 115. Further, the cumulative mass of the concave walls 33, 34 is less than the ribbed wall 140 that connects the convex walls 143, 144 together in the prior art rotor 115. The lighter weight of the blocking rotor 15 provides improved performance and, despite the use of less material to fabricate the blocking rotor 15 than the amount of material used to fabricate the blocking rotor 115, the blocking rotor 15 is stronger, particularly with respect to transverse bending or bending about an axis defined by the shaft 54. Further, by placing the gates and overflow along the concave walls 33, 34, the outer surfaces 45, 46 of the convex walls 43, 44 remain smooth for proper engagement with the protuberances 48, 49 disposed along the inner surface 51 of the arcuate chamber 52 (FIG. 1). The casting technique where the gates and overflows are disposed along the concave walls 33, 34 as opposed to the convex walls 43, 44 also produces less rejects and improved castability. The improved castability also leads to lower porosity and thereby increased strength. The lighter weight provided by the disclosed blocking rotor 15 provides a reduced moment of inertia and a reduced static bearing load, which contributes to decreasing any impedance to the flow of fluid through the flow meter 10. The reduced moment of inertia also enables the rotor 15 to stop more quickly which results in a more accurate throughput reading and a more accurate dispense.

Figure 2C:
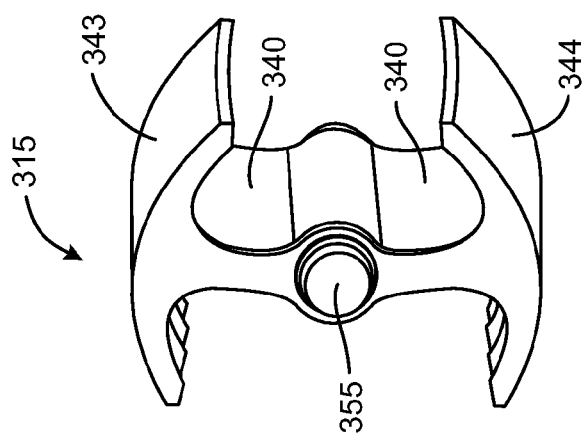
Figure 2B:
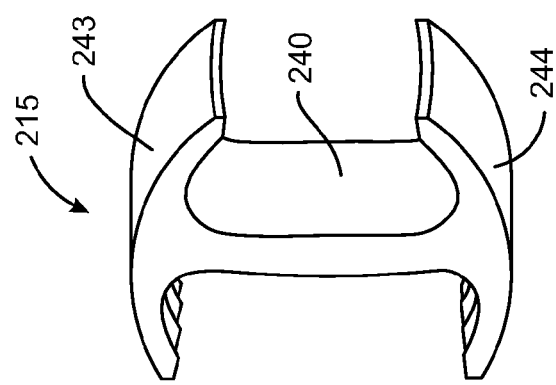
Figure 4:
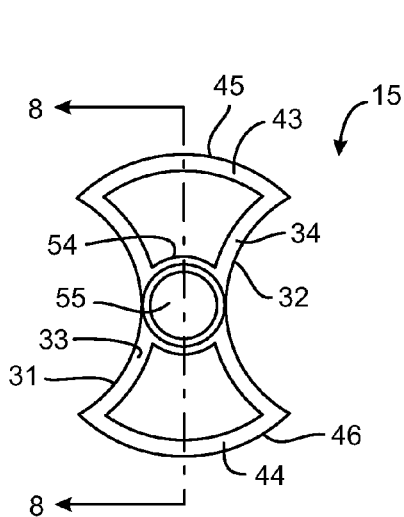
FIG. 4 is a front plan view of the blocking rotor shown in FIGS. 1 and 3.
Figure 5:
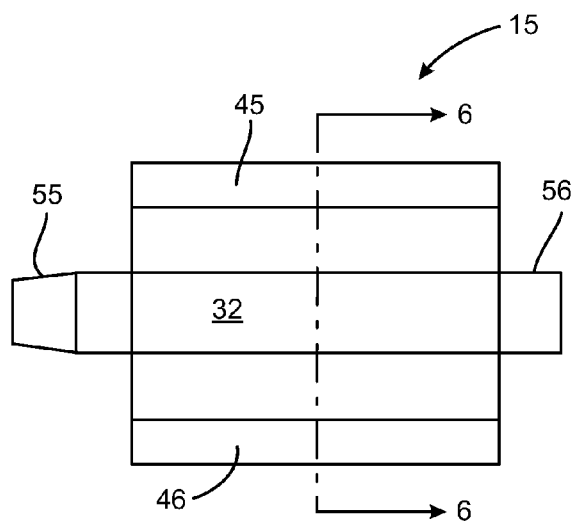
FIG. 5 is a side plan view of the blocking rotor shown in FIGS. 1 and 3-4.

Further, as noted above, the blocking rotors 215, 315 of FIGS. 2B-2C also have high moments of inertia and, like the blocking rotor 115 of FIG. 3A, the rotors 215, 315 are prone to breakage along the center walls 240, 340 that connect the convex walls 243, 244 and 343, 344 together. In contrast, the shaftless hollow blocking rotor 415 of FIG. 3B has a lower moment of inertia and superior strength compared to the rotors 115, 215, 315 of FIGS. 2A-2C. The convex walls 431, 432 are coupled together at or near the apexes of the concave walls 431, 432 and, like the rotor 15 of FIG. 3A, the concave walls 431, 432 are disposed between and connect the convex walls 445, 446.

Figure 9:
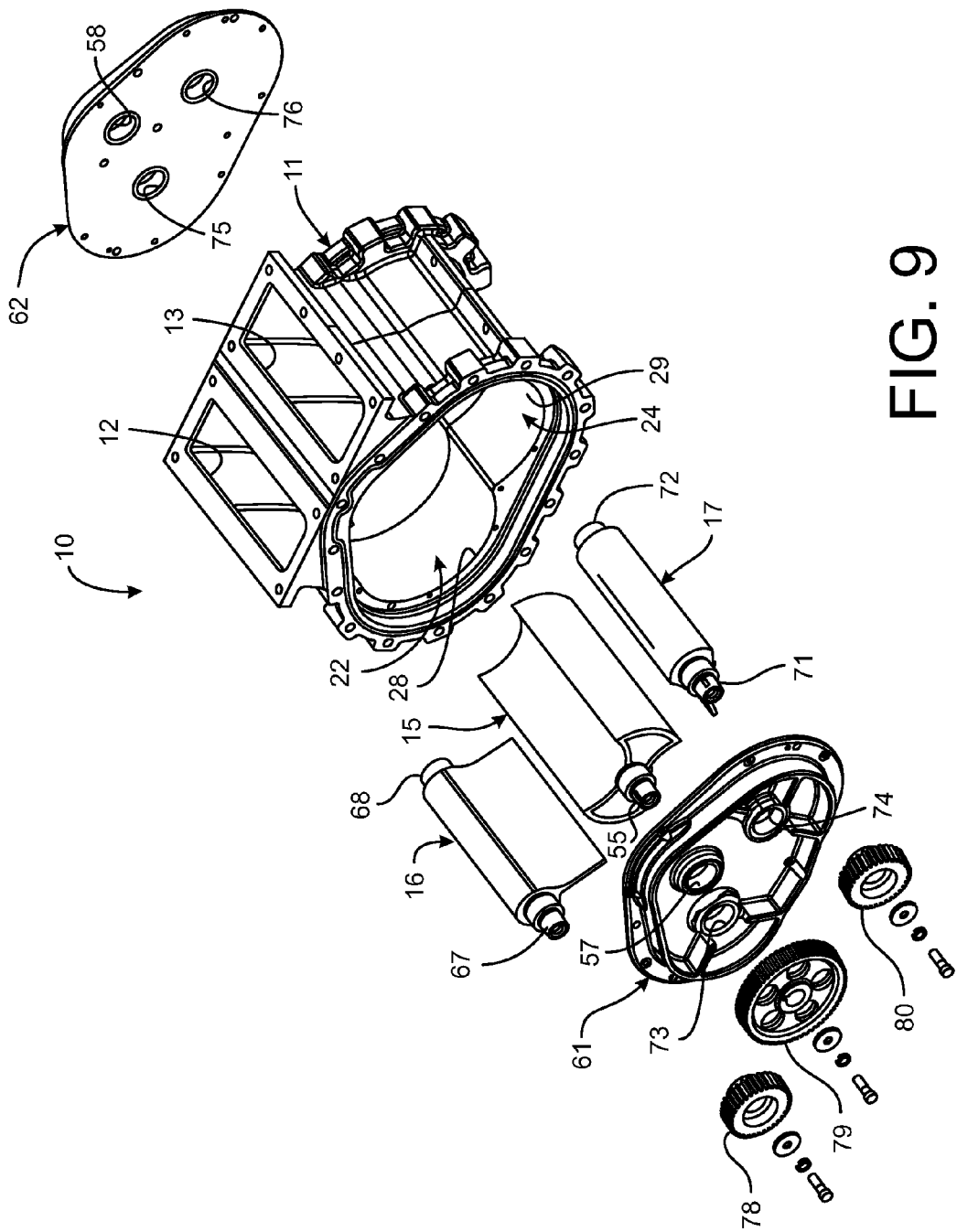
FIG. 9 is an exploded view of a disclosed flow meter.

Briefly turning to FIG. 9, an exploded view of the flow meter 10 is provided illustrating the two end plates 61, 62 and the housing 11 in greater detail. The displacement rotors 16, 17 also include journals 67, 68 and 71, 72 respectively that are received in the openings 73, 74 of the end plate 61 and the openings 75, 76 of the end plate 62. Gears 78, 79, 80 are coupled to the journals 67, 55, 71 respectively and maintain the timing of the rotation of the three rotors 16, 15, 17.

INDUSTRIAL APPLICABILITY

Thus, an improved flow meter is disclosed that features a hollow, lightweight blocking rotor. Instead of the cross section of the blocking rotor being filled with material, the blocking rotor is formed from a pair of convex walls and a pair of concave walls of a prescribed thickness that results in a rotor of substantially reduced mass. A shaft-like structure may optionally be used to connect the concave walls together or the concave walls may meet at their respective apexes. The convex walls are purposely structured in order to reduce hydrodynamic losses that occur in the third chamber 52 as with traditional rotor designs. Because of the improved strength provided by the disclosed hollow blocking rotor, additional internal ribbing is unnecessary. The disclosed hollow blocking rotors have lower moments of inertia, resulting in faster stopping abilities and therefore more accurate throughput readings and dispense.

The improved rotor is also easier to cast with improved results as the gating and overflows are disposed on the concave walls that are wiped by the vanes of the displacement rotors as opposed to the outside surfaces of the convex walls which are used to provide a seal and prevent hydrodynamic losses in the upper or third chamber in which the blocking rotor is disposed. Flexability is also provided in the design of the shaft that connects the concave walls together as this shaft-like structure may be solid, hollow, etc. As noted above, the shaft-like structure may be provided in the form shown in the drawings or a suitable structural element may be created by coupling the convex walls together at their respective apexes.

What is claimed is:

1. A blocking rotor for a rotary fluid displacement device that also includes a pair of displacement rotors that flank the blocking rotor, comprising:
   a pair of convex walls and a pair of concave walls,
   each concave wall being disposed between and coupled to the pair of opposing convex walls, the concave walls being coupled together,
   wherein the concave walls provide clearance for rotation of the displacement rotors.

2. The blocking rotor of claim 1 wherein the concave walls are coupled together by a shaft.

3. The blocking rotor of claim 2 wherein the shaft couples the concave walls together at apexes of the concave walls.

4. The blocking rotor of claim 2 wherein the shaft is hollow.

5. The blocking rotor of claim 2 wherein the shaft is solid.

6. The blocking rotor of claim 1 wherein the concave walls are coupled together at apexes of the concave walls.

7. The blocking rotor of claim 1 wherein the blocking rotor is cast with gates and overflows being disposed on the concave walls.

8. A flow meter comprising:
   a housing having a cavity with in inlet and an outlet;
   a pair of displacement rotors with a blocking rotor disposed between the displacement rotors;
   the blocking rotor including a pair of convex walls and a pair of concave walls, each concave wall being disposed between and coupled to the pair of opposing convex walls, the concave walls being coupled together;
   wherein the concave walls provide clearance for rotation of the displacement rotors when the displacement rotors sweep along said concave walls.

9. The flow meter of claim 8 wherein a shaft couples the concave walls together.

10. The flow meter of claim 9 wherein the shaft couples the concave walls together at apexes of the concave walls.

11. The flow meter of claim 9 wherein the shaft is hollow.

12. The flow meter of claim 9 wherein the shaft is solid.

13. The flow meter of claim 8 wherein the concave walls are coupled together at apexes of the concave walls.

14. The flow meter of claim 10 wherein the blocking rotor is cast in a mold that includes gates and overflows and wherein the gates and overflows being disposed on the concave walls.

15. The flow meter of claim 10 wherein the cavity is trefoil-shaped.

* * * * *